United States Patent [19]
Case

[11] Patent Number: 5,845,251
[45] Date of Patent: Dec. 1, 1998

[54] METHOD, SYSTEM AND PRODUCT FOR MODIFYING THE BANDWIDTH OF SUBBAND ENCODED AUDIO DATA

[75] Inventor: Eliot M. Case, Denver, Colo.

[73] Assignees: U S West, Inc., Denver; MediaOne Group Inc., Englewood, both of Colo.

[21] Appl. No.: 771,792

[22] Filed: Dec. 20, 1996

[51] Int. Cl.[6] .................................................. H04B 1/00
[52] U.S. Cl. ................................. 704/500; 704/501
[58] Field of Search ................................ 704/208, 278, 704/233, 500, 501, 503, 504; 381/62, 119, 118

[56] References Cited

U.S. PATENT DOCUMENTS

| | | |
|---|---|---|
| 4,061,875 | 12/1977 | Freifeld et al. . |
| 4,099,035 | 7/1978 | Yanick . |
| 4,118,604 | 10/1978 | Yanick . |
| 4,156,116 | 5/1979 | Yanick . |
| 4,509,186 | 4/1985 | Omura et al. . |
| 4,536,886 | 8/1985 | Papamichalis et al. . |
| 4,703,480 | 10/1987 | Westall et al. . |
| 4,813,076 | 3/1989 | Miller . |
| 4,820,059 | 4/1989 | Miller et al. . |
| 4,969,192 | 11/1990 | Chen et al. . |
| 4,975,958 | 12/1990 | Hanada et al. . |
| 5,033,090 | 7/1991 | Weinrich . |
| 5,040,217 | 8/1991 | Brandenburg et al. . |
| 5,140,638 | 8/1992 | Moulsley et al. . |
| 5,199,076 | 3/1993 | Taniguchi et al. . |
| 5,201,006 | 4/1993 | Weinrich . |
| 5,226,085 | 7/1993 | Di Francesco . |
| 5,227,788 | 7/1993 | Johnston et al. . |
| 5,233,660 | 8/1993 | Chen . |
| 5,235,669 | 8/1993 | Ordentlich et al. . |
| 5,255,343 | 10/1993 | Su . |
| 5,285,498 | 2/1994 | Johnston . |
| 5,293,449 | 3/1994 | Tzeng . |
| 5,293,633 | 3/1994 | Robbins . |
| 5,301,019 | 4/1994 | Citta . |
| 5,301,205 | 4/1994 | Tsutsui et al. . |
| 5,329,613 | 7/1994 | Brase et al. . |
| 5,341,457 | 8/1994 | Hall, II et al. . |
| 5,353,375 | 10/1994 | Goto et al. . |
| 5,404,377 | 4/1995 | Moses . |
| 5,467,139 | 11/1995 | Lankford . |
| 5,473,631 | 12/1995 | Moses . |
| 5,488,665 | 1/1996 | Johnston et al. . |
| 5,500,673 | 3/1996 | Zhou . |
| 5,509,017 | 4/1996 | Brandenburg et al. . |
| 5,511,093 | 4/1996 | Edler et al. . |
| 5,512,939 | 4/1996 | Zhou . |
| 5,515,395 | 5/1996 | Tsutsui . |
| 5,647,008 | 7/1997 | Farhangi et al. .................. 381/119 |

FOREIGN PATENT DOCUMENTS

| | | |
|---|---|---|
| 0446037A2 | 9/1991 | European Pat. Off. . |
| 0446037A3 | 9/1991 | European Pat. Off. . |
| 0607989A2 | 7/1994 | European Pat. Off. . |
| 0607989A3 | 7/1994 | European Pat. Off. . |
| WO91/06945 | 5/1991 | WIPO . |
| WO94/25959 | 11/1994 | WIPO . |

OTHER PUBLICATIONS

New Digital Hearing Aids Perk Up Investers' Ears, St. Louis Post–Dispatch, Sep. 27, 1995.
Jean–Pierre Renard, Ph.D., B.B.A., High Fidelity Audio Coding, pp. 87–97.

*Primary Examiner*—David R. Hudspeth
*Assistant Examiner*—Harold Zintel
*Attorney, Agent, or Firm*—Brooks & Kushman

[57] ABSTRACT

A method, system and product are provided for selectively modifying an encoded audio signal. The method includes receiving the encoded audio signal, the encoded audio signal having a first frequency bandwidth, and identifying a delivery point for the encoded audio signal, the delivery point having a second frequency bandwidth. The method also includes selecting a plurality of subbands from the first frequency bandwidth based on the second frequency bandwidth, and modifying the encoded audio signal based on the plurality of subbands selected. The system includes control logic for performing the method. The product includes a storage medium having computer readable programmed instructions for performing the method.

20 Claims, 3 Drawing Sheets

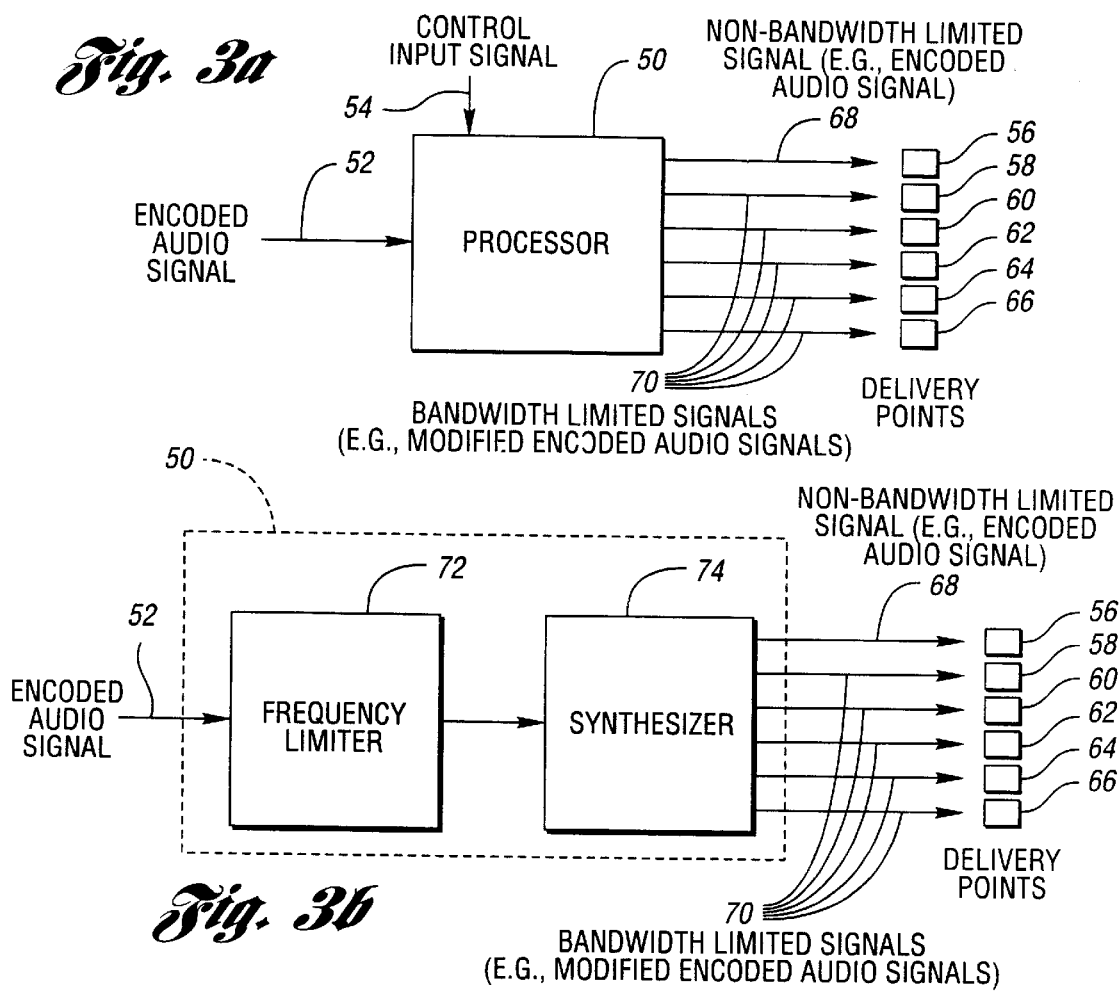
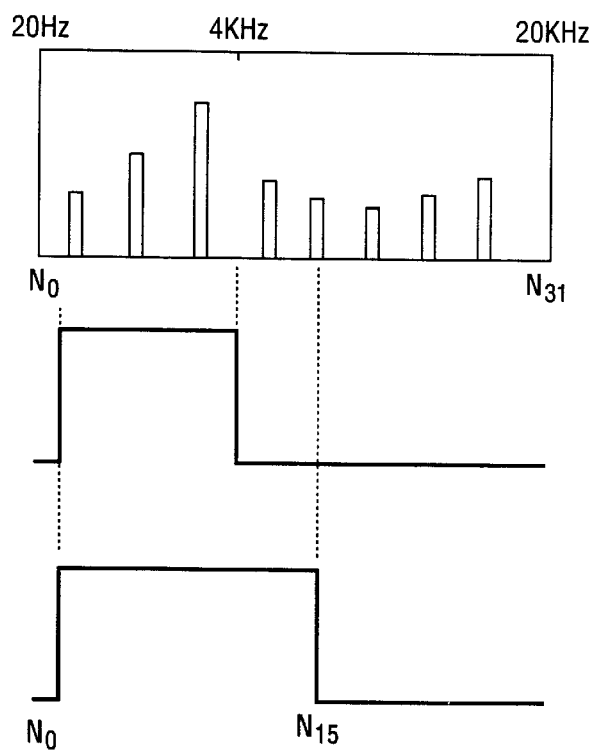

METHOD, SYSTEM AND PRODUCT FOR MODIFYING THE BANDWIDTH OF SUBBAND ENCODED AUDIO DATA

CROSS-REFERENCE TO RELATED APPLICATIONS

This application is related to U.S. patent application Ser. Nos. 08/771,790 entitled "Method, System And Product For Lossless Encoding Of Digital Audio Data"; 08/771,462 entitled "Method, System And Product For Modifying The Dynamic Range Of Encoded Audio Signals"; 08/771,512 entitled "Method, System And Product For Harmonic Enhancement Of Encoded Audio Signals";08/769,911 entitled "Method, System And Product For Multiband Compression Of Encoded Audio Signals";08/777,724 entitled "Method, System And Product For Mixing Of Encoded Audio Signals"; 08/769,732 entitled "Method, System And Product For Using Encoded Audio Signals In A Speech Recognition System"; 08/772,591 entitled "Method, System And Product For Synthesizing Sound Using Encoded Audio Signals"; 08/769,731 entitled "Method, System And Product For Concatenation Of Sound And Voice Files Using Encoded Audio Data"; and 08/771,469 entitled "Graphic Interface System And Product For Editing Encoded Audio Data", all of which were filed on the same date and assigned to the same assignee as the present application.

TECHNICAL FIELD

This invention relates to a method, system and product for modifying encoded audio data to conform to limited transmission, storage and/or playback capabilities without creating multiple source files.

BACKGROUND ART

To more efficiently transmit digital audio data on low bandwidth data networks, or to store larger amounts of digital audio data in a small data space, various data compression or encoding systems and techniques have been developed. Many such encoded audio systems use as a main element in data reduction the concept of not transmitting, or otherwise not storing portions of the audio that might not be perceived by an end user. As a result, such systems are referred to as perceptually encoded or "lossy" audio systems.

However, as a result of such data elimination, perceptually encoded audio systems are not considered "audiophile" quality, and suffer from processing limitations. To overcome such deficiencies, a method, system and product have been developed to encode digital audio signals in a loss-less fashion, which is more properly referred to as "component audio" rather than perceptual encoding, since all portions or components of the digital audio signal are retained. Such a method, system and product are described in detail in U.S. patent application Ser. No. 08/771,790 entitled "Method, System And Product For Lossless Encoding Of Digital Audio Data", which was filed on the same date and assigned to the same assignee as the present application, and is hereby incorporated by reference.

To transmit across narrow bandwidth networks or to playback at narrow bandwidth destinations, however, such encoded audio signals must first be fully decoded and then converted to the data format associated with such transmission networks or playback destinations. Moreover, for encoded audio sound files, multiple copies thereof must be made off-line and stored for each different network or destination.

To address these problems, an encoded audio system could be designed to scale the audio at encoding according to the bandwidth and data format characteristics of a selected transmission network or playback destination. However, such a system would not address dynamically re-scaleable transmission within a given data stream (i.e., real-time).

Thus, there exists a need for a method, system and product for modifying transmission and playback of encoded audio signals. Such a method, system and product would act on a passing data stream to provide dynamic, real-time conversion between data formats, thereby eliminating the need for multiple stored copies of a sound asset for every desired format.

SUMMARY OF THE INVENTION

Accordingly, it is the principle object of the present invention to provide an improved method, system and product for modifying transmission and playback of encoded audio signals.

According to the present invention, then, a method is provided for selectively modifying an encoded audio signal. The method comprises receiving the encoded audio signal, the encoded audio signal having a first frequency bandwidth, and identifying a delivery point for the encoded audio signal, the delivery point having a second frequency bandwidth. The method further comprises selecting a plurality of subbands from the first frequency bandwidth based on the second frequency bandwidth, and modifying the encoded audio signal based on the plurality of subbands selected.

A system for selectively modifying an encoded audio signal is also provided. The system comprises a receiver for receiving the encoded audio signal, the encoded audio signal having a first frequency bandwidth, and means for identifying a delivery point for the encoded audio signal, the delivery point having a second frequency bandwidth. The system further comprises control logic operative to select a plurality of subbands from the first frequency bandwidth based on the second frequency bandwidth, and modify the encoded audio signal based on the plurality of subbands selected.

A product for selectively modifying an encoded audio signal is also provided. The product comprises a storage medium having computer readable programmed instructions recorded thereon. The instructions are operative to select a plurality of subbands from a first frequency bandwidth associated with the encoded audio signal based on a second frequency bandwidth associated with a delivery point, and modify the encoded audio signal based on the plurality of subbands selected.

These and other objects, features and advantages will be readily apparent upon consideration of the following detailed description in conjunction with the accompanying drawings.

BRIEF DESCRIPTION OF THE DRAWINGS

FIGS. 3a and 3b are simplified block diagrams of the system of the present invention;

FIGS. 4a, 4b and 4c are graphic representations of original encoded audio data and exemplary modifications thereto according to the present invention.

BEST MODE FOR CARRYING OUT THE INVENTION

Figure 1:
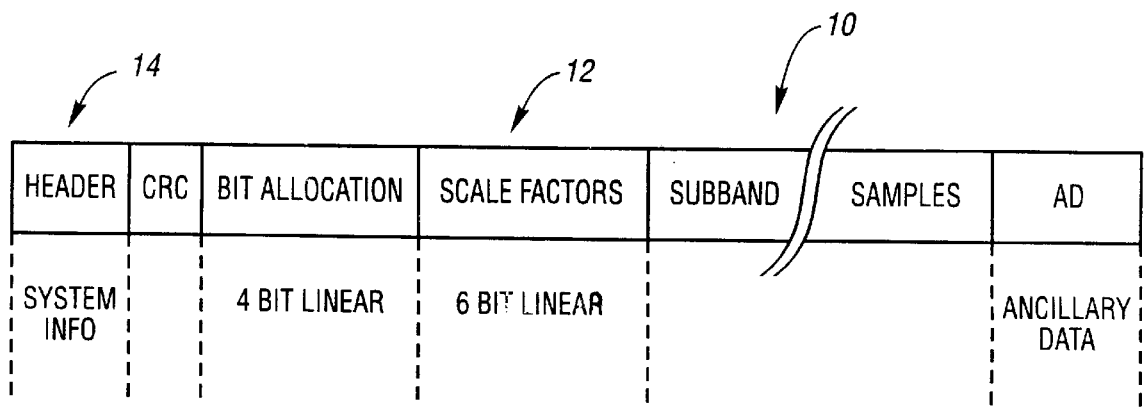
FIG. 1 is an exemplary encoding format for an audio frame according to prior art perceptually encoded audio systems.

Referring now to FIGS. 1–5, the preferred embodiment of the present invention will now be described. FIG. 1 depicts an exemplary encoding format for an audio frame according to prior art perceptually encoded audio systems, such as the various layers of the Motion Pictures Expert Group (MPEG), Musicam, or others. Examples of such systems are described in detail in a paper by K. Brandenburg et al. entitled "ISO-MPEG-1 Audio: A Generic Standard For Coding High-Quality Digital Audio", Audio Engineering Society, 92nd Convention, Vienna, Austria, March 1992, which is hereby incorporated by reference.

In that regard, it should be noted that the present invention can be applied to subband data encoded as either time versus amplitude (low bit resolution audio bands as in MPEG audio layers 1 or 2, and Musicam) or as frequency elements representing frequency, phase and amplitude data (resulting from Fourier transforms or inverse modified discrete cosine spectral analysis as in MPEG audio layer 3, Dolby AC3 and similar means of spectral analysis). It should further be noted that the present invention is suitable for use with any system using mono, stereo or multichannel sound including Dolby AC3, 5.1 and 7.1 channel systems.

As seen in FIG. 1, such perceptually encoded digital audio includes multiple frequency subband data samples (10), as well as 6 bit dynamic scale factors (12) (per subband) representing an available dynamic range of approximately 120 decibels (dB) given a resolution of 2 dB per scale factor. The bandwidth of each subband is ⅓ octave. Such perceptually encoded digital audio still further includes a header (14) having information pertaining to sync words and other system information such as data formats, audio frame sample rate, channels, etc.

To greatly increase the available dynamic range and/or the resolution thereof, one or more bits may be added to the dynamic scale factors (12). For example, by using 8 bit dynamic scale factors, the dynamic range is doubled to 256 dB and given an improved 1 dB per scale factor resolution. Alternatively, such 8 bit dynamic scale factors, with a given resolution of 0.5 dB per scale factor, will provide a dynamic range of 128 dB. In either case, the accuracy of storage is increased or maintained well beyond what is needed for dynamic range, while the side-effects of low resolution dynamic scaling are reduced.

Figure 2:
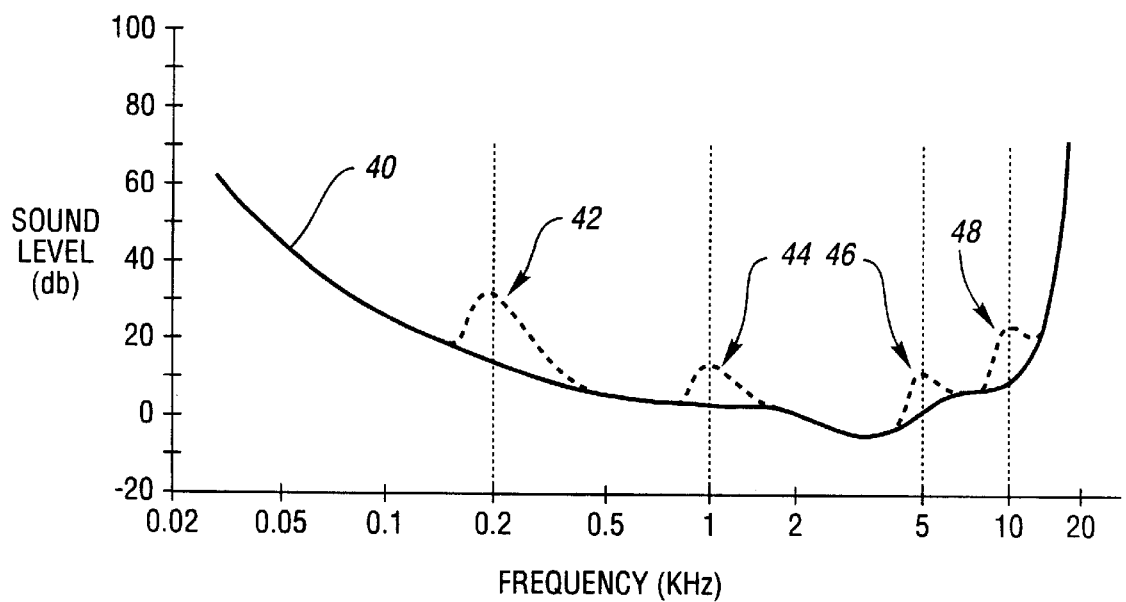
FIG. 2 is a psychoacoustic model of a human ear including exemplary masking effects for use with the present invention.

As previously discussed, perceptually encoded audio systems eliminate portions of the audio that might not be perceived by an end user. This is accomplished using well known psychoacoustic modeling of the human ear. Referring now to FIG. 2, such a psychoacoustic model including exemplary masking effects is shown. As seen therein, at a given frequency (in kHz), sound levels (in dB) below the base line curve (40) are inaudible. Using this information, prior art perceptually encoded audio systems eliminate data samples in those frequency subbands where the sound level is likely inaudible.

As also seen therein, short band noise centered at various frequencies (42, 44, 46, 48) modifies the base line curve (40) to create what are known as masking effects. That is, such noise (42, 44, 46, 48) raises the level of sound required around such frequencies before that sound will be audible to the human ear. Using this information, prior art perceptually encoded audio systems further eliminate data samples in those frequency subbands where the sound level is likely inaudible due to such masking effects.

Alternatively, using a loss-less component audio encoding scheme, such masked audio may be retained. Once again, such a loss-less component audio encoding scheme is described in detail in U.S. patent application Ser. No. 08/771,790 entitled "Method, System And Product For Lossless Encoding Of Digital Audio Data", which was filed on the same date and assigned to the same assignee as the present application, and has been incorporated herein by reference.

In either case, if no information is present to be encoded into a subband, the subband does not need to be transmitted. Moreover, if the subband data is well below the level of audibility (not including masking effects), as shown by base line curve (40) of FIG. 2, the particular subband need not be encoded.

Referring now to FIG. 3*a*, a simplified block diagram of the system of the present invention is shown. As seen therein, the system preferably comprises an appropriately programmed processor (50) for Digital Signal Processing (DSP). Processor (50) acts as a receiver for receiving an encoded audio signal (52) (which may be a stored sound file/asset) having a frequency bandwidth associated therewith. In that regard, as previously described, encoded audio signal (52) may be either a perceptually encoded audio signal or a component audio signal.

Once programmed, processor (50) provides control logic for performing various functions of the present invention. In that regard, processor (50) also receives control input (54) for identifying any one of a plurality of particular delivery points (56, 58, 60, 62, 64, 66) for the encoded audio signal (52) Each delivery point (56, 58, 60, 62, 64, 66) has its own frequency bandwidth associated therewith. In that regard, delivery points (56, 58, 60, 62, 64, 66) may be transmission networks, playback destinations, or storage mediums, and may have any type of data format including, but not limited to, 8K 8 bit PCM, 6K 4 bit ADPCM, 16 bit 44.1K PCM (including stereo version), component audio, or perceptually encoded audio such as MPEG (layers 1, 2 or 3), Musicam, or Real Audio (i.e., internet).

Still referring to FIG. 3*a*, the control logic of processor (50) is operative to select a plurality of subbands from the frequency bandwidth associated with the encoded audio signal (52) based on the frequency bandwidth associated with the particular delivery point (56, 58, 60, 62, 64, 66) identified. Where the frequency bandwidths of the encoded audio signal (52) and the identified delivery point (56, 58, 60, 62, 64, 66) are the same, the plurality of frequency subbands selected (68) may be all the frequency subbands associated with the encoded audio signal (52). This might be the case where the encoded audio signal (52) has an MPEG layer 2 encoded audio data format and the delivery point has an MPEG layer 3 encoded audio data format, or vice versa. However, where the frequency bandwidth of the encoded audio signal (52) is greater than the frequency bandwidth of the delivery point (56, 58, 60, 62, 64, 66) identified, the plurality of frequency subbands selected are those frequency subbands outside the frequency bandwidth associated with the identified delivery point (56, 58, 60, 62, 64, 66).

The control logic of processor (50) is further operative to then modify the encoded audio signal based on the plurality of subbands selected. To modify the encoded audio signal (52), the control logic may be operative to directly map/ convert/translate/transcode the data format associated with the encoded audio signal (52) to the data format associated with the particular delivery point (56, 58, 60, 62, 64, 66)

Alternatively, however, to modify the encoded audio signal (52), the control logic may be further operative to eliminate from the encoded audio signal (52) the plurality of subbands selected to create a modified encoded audio signal (which again may be a sound file/asset for storage) (70) for continued transmission. In that case, the control logic of processor (50) is still further operative to map/convert/translate/transcode the data format associated with the encoded audio signal (52, 68) or the modified encoded audio signal (70) to the data format associated with the delivery point (56, 58, 60, 62, 64, 66) for later decoding and playback. Once again, such delivery points (56, 58, 60, 62, 64, 66) may be any transmission networks, playback destinations, or storage mediums having any data format such as those previously described.

In such a fashion, the present invention selects portions of the encoded audio signal (52) for mapping/conversion/translation/transcoding to the data format of the delivery point (56, 58, 60, 62, 64, 66). In that regard, the only portions of the encoded audio signal (52) selected are those needed based on the bandwidth and data format characteristics of the delivery point (56, 58, 60, 62, 64, 66).

As is readily apparent, then, processor (50) may also be represented as shown in the simplified block diagram of FIG. 3b. As seen therein, and with continuing reference to FIG. 3a, processor (50) may comprise frequency limiting means (72) for selecting a plurality of subbands from the frequency bandwidth associated with the encoded audio signal (52) based on the frequency bandwidth associated with a particular delivery point (56, 58, 60, 62, 64, 66), according to the criteria previously described. In this example, processor (50) also comprises synthesis means (74) for modifying and/or mapping/converting/translating/transcoding the encoded audio signal (52), as also previously described.

Referring now to FIGS. 4a–c, graphic representations of original encoded audio data and exemplary modifications thereto according to the present invention are shown. In that regard, FIG. 4a depicts those frequency subbands encoded for an audio signal according to a 32 subband perceptual encoding audio system having a frequency bandwidth from 20 Hz to 20 kHz. To modify such an encoded audio signal for transmission and/or playback over an 8K 8 bit PCM digital phoneline according to the present invention as described above, only those frequency subbands between 20 Hz and 4 kHz might be mapped from the encoded audio signal as shown in FIG. 4b. Similarly, to modify such an encoded audio signal for transmission and/or playback over another perceptually encoded audio system having only 16 subbands according to the present invention as described above, only one-half of the 32 subbands of the original encoded audio signal might be mapped from the encoded audio signal as shown in FIG. 4c.

Figure 5:
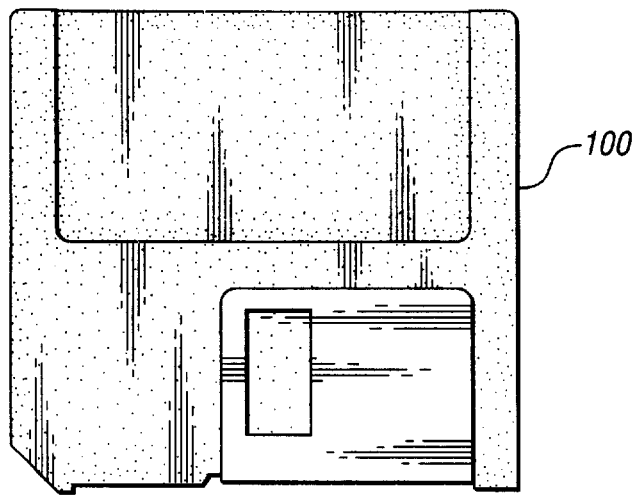
FIG. 5 is an exemplary storage medium for use with the product of the present invention.

Referring finally to FIG. 5, an exemplary storage medium for the product of the present invention is shown. In that regard, storage medium (100) is depicted as a conventional floppy disk, although any other type of storage medium may also be used.

Storage medium (100) has recorded thereon computer readable programmed instructions for performing various functions of the present invention. More particularly, storage medium (100) includes instructions operative to select a plurality of subbands from a first frequency bandwidth associated with the encoded audio signal based on a second frequency bandwidth associated with a delivery point, and modify the encoded audio signal based on the plurality of subbands selected.

In that regard, as previously discussed, the second frequency bandwidth may be narrower than the first frequency bandwidth, and each of the plurality of subbands selected may have a frequency outside the second frequency bandwidth. To modify the encoded audio signal the instructions are then further operative to eliminate from the encoded audio signal the plurality of subbands selected to create a modified encoded audio signal.

Further the delivery point may be a transmission network and, to modify the encoded audio signal, the instructions are operative to translate a first data format associated with the encoded audio signal to a second data format associated with the transmission network. Still further the delivery point may be a playback destination and, to modify the encoded audio signal, the instructions are operative to translate a first data format associated with the encoded audio signal to a second data format associated with the playback destination.

Thus, by selectively omitting information higher or lower in frequency than needed for the target application, a given sound file will be modified and transmitted according to the abilities required or requested without having multiple copies of the asset at differing data rates and compression levels. By reading the header and content specific information within an encoded sound file (or passing data stream), only the information and data elements are transmitted that can either be handled by the current transmission data width or target application, or to decrease download time, etc. The subtracted information can either be filled back in at the receiving end to comply with current standard decoders (such as MPEG layer 1,2,3 etc.) or be constructed into file formats (or data streams) such as Mu law 8 bit PCM for telephone lines. The data density can be constantly modulated during transmission and resynthesized at the receiving end to whatever conventions are required for use.

In such fashion, faster delivery of sound files across narrow bandwidth networks is provided, making real-time scaling of data transmit rates possible. Indeed, transmission speeds are increased for whatever kind of transport system used, such as internet, interactive TV, satellite feeds, phonelines, etc. Moreover, only one source file is necessary for all variable data rates, modes, formats and qualities of the asset. In that regard, bit rates are dynamically varied during transmission. Thus, multiple stored copies of an asset in every desired data format are no longer necessary.

It should be noted that this invention is designed to act in real-time on a passing encoded audio data stream at the distribution level (at the point of transmission or the point of delivery) and/or as part of a final decoder that reassembles the signals back to a normal linear audio signal, rather than as part of the original encoder. In such a fashion, the original program material can be encoded according to widely deployed encoding schemes/systems and remain uncompromised. However, the present invention can also be used for non real-time applications.

In that same regard, it should be noted that the present invention is suitable for use in any type of DSP application including computer systems, hearing aids, transmission across networks including cellular, wireless and cable telephony, internet, cable television, satellites, audio/video post-production, etc. It should still further be noted that the present invention can be used in conjunction with the inventions disclosed in U.S. patent application Ser. Nos. 08/771,790 entitled "Method, System And Product For Lossless Encoding Of Digital Audio Data"; 08/771,462 entitled "Method, System And Product For Modifying The Dynamic Range Of Encoded Audio Signals"; 08/771,512 entitled "Method, System And Product For Harmonic Enhancement Of Encoded Audio Signals"; 08/769,911 entitled "Method, System And Product For Multiband Compression Of Encoded Audio Signals"; 08/777,724 entitled "Method, System And Product For Mixing Of Encoded Audio Signals"; 08/769,732 entitled "Method, System And Product For Using Encoded Audio Signals In A Speech Recognition System"; 08/772,591 entitled "Method, System And Product For Synthesizing Sound Using Encoded Audio Signals"; 08/769,731 entitled "Method, System And Product For Concatenation Of Sound And Voice Files Using Encoded Audio Data"; and 08/771,469 entitled "Graphic Interface System And Product For Editing Encoded Audio Data", all of which were filed on the same date and assigned to the same assignee as the present application, and which are hereby incorporated by reference.

As is readily apparent from the foregoing description, then, the present invention provides a method, system and product for modifying transmission and playback of encoded audio signals. More particularly, the present invention acts on a passing data stream to provide dynamic, real-time conversion between data formats, thereby eliminating the need for multiple stored copies of a sound asset for every known format.

It is to be understood that the present invention has been described above in an illustrative manner and that the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described herein.

What is claimed is:

1. A method for selectively modifying an encoded audio signal, the method comprising:
   receiving the encoded audio signal, the encoded audio signal having a first frequency bandwidth;
   identifying a delivery point for the encoded audio signal, the delivery point having a second frequency bandwidth;
   selecting a plurality of subbands from the first frequency bandwidth based on the second frequency bandwidth; and
   modifying the encoded audio signal based on the plurality of subbands selected.

2. The method of claim 1 wherein the second frequency bandwidth is narrower than the first frequency bandwidth, each of the plurality of subbands selected has a frequency outside the second frequency bandwidth, and modifying the encoded audio signal includes eliminating from the encoded audio signal the plurality of subbands selected to create a modified encoded audio signal.

3. The method of claim 1 wherein the delivery point is a transmission network and modifying the encoded audio signal includes translating a first data format associated with the encoded audio signal to a second data format associated with the transmission network.

4. The method of claim 1 wherein the delivery point is a playback destination and modifying the encoded audio signal includes translating a first data format associated with the encoded audio signal to a second data format associated with the playback destination.

5. The method of claim 1 wherein the delivery point is a storage medium and modifying the encoded audio signal includes translating a first data format associated with the encoded audio signal to a second data format associated with the storage medium.

6. The method of claim 2 wherein the delivery point is a transmission network, the method further comprising translating a first data format associated with the modified encoded audio signal to a second data format associated with the transmission network.

7. The method of claim 2 wherein the delivery point is a playback destination, the method further comprising translating a first data format associated with the modified encoded audio signal to a second data format associated with the playback destination.

8. The method of claim 2 wherein the delivery point is a storage medium, the method further comprising translating a first data format associated with the modified encoded audio signal to a second data format associated with the storage medium.

9. A system for selectively modifying an encoded audio signal, the system comprising:
   a receiver for receiving the encoded audio signal, the encoded audio signal having a first frequency bandwidth;
   means for identifying a delivery point for the encoded audio signal, the delivery point having a second frequency bandwidth; and
   control logic operative to select a plurality of subbands from the first frequency bandwidth based on the second frequency bandwidth, and modify the encoded audio signal based on the plurality of subbands selected.

10. The system of claim 9 wherein the second frequency bandwidth is narrower than the first frequency bandwidth, each of the plurality of subbands selected has a frequency outside the second frequency bandwidth, and to modify the encoded audio signal the control logic is further operative to eliminate from the encoded audio signal the plurality of subbands selected to create a modified encoded audio signal.

11. The system of claim 9 wherein the delivery point is a transmission network and, to modify the encoded audio signal, the control logic is operative to translate a first data format associated with the encoded audio signal to a second data format associated with the transmission network.

12. The system of claim 9 wherein the delivery point is a playback destination and, to modify the encoded audio signal, the control logic is operative to translate a first data format associated with the encoded audio signal to a second data format associated with the playback destination.

13. The system of claim 9 wherein the delivery point is a storage medium and, to modify the encoded audio signal, the control logic is operative to translate a first data format associated with the encoded audio signal to a second data format associated with the storage medium.

14. The system of claim 10 wherein the delivery point is a transmission network and the control logic is further operative to translate a first data format associated with the modified encoded audio signal to a second data format associated with the transmission network.

15. The system of claim 10 wherein the delivery point is a playback destination and the control logic is further operative to translate a first data format associated with the modified encoded audio signal to a second data format associated with the playback destination.

16. The system of claim 10 wherein the delivery point is a storage medium and the control logic is further operative to translate a first data format associated with the modified encoded audio signal to a second data format associated with the storage medium.

17. A product for selectively modifying an encoded audio signal, the product comprising a storage medium having computer readable programmed instructions recorded thereon, the instructions operative to select a plurality of subbands from a first frequency bandwidth associated with the encoded audio signal based on a second frequency bandwidth associated with a delivery point, and modify the encoded audio signal based on the plurality of subbands selected.

18. The product of claim 17 wherein the second frequency bandwidth is narrower than the first frequency bandwidth, each of the plurality of subbands selected has a frequency outside the second frequency bandwidth, and to modify the encoded audio signal the instructions are further operative to eliminate from the encoded audio signal the plurality of subbands selected to create a modified encoded audio signal.

19. The product of claim 17 wherein the delivery point is a transmission network and, to modify the encoded audio signal, the instructions are operative to translate a first data format associated with the encoded audio signal to a second data format associated with the transmission network.

20. The product of claim 17 wherein the delivery point is a playback destination and, to modify the encoded audio signal, the instructions are operative to translate a first data format associated with the encoded audio signal to a second data format associated with the playback destination.

* * * * *